United States Patent
Turner et al.

(10) Patent No.: US 7,702,501 B2
(45) Date of Patent: Apr. 20, 2010

(54) TECHNIQUES FOR PASSING DATA ACROSS THE HUMAN-MACHINE INTERFACE

(75) Inventors: Bryan Turner, Cary, NC (US); John Toebes, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 949 days.

(21) Appl. No.: 11/431,768

(22) Filed: May 10, 2006

(65) Prior Publication Data
US 2007/0265829 A1    Nov. 15, 2007

(51) Int. Cl.
*G06F 17/27* (2006.01)
(52) U.S. Cl. ............... 704/9; 704/257; 704/10
(58) Field of Classification Search ............... 704/1–10, 704/231, 235, 251, 257, 270, 270.1, 277, 704/272; 379/88.02
See application file for complete search history.

(56) References Cited
U.S. PATENT DOCUMENTS

| | | | |
|---|---|---|---|
| 5,855,002 A | 12/1998 | Armstrong | |
| 6,295,509 B1 | 9/2001 | Driskell | |
| 6,401,065 B1 | 6/2002 | Kanevsky et al. | |
| 6,903,887 B2 | 6/2005 | Asano et al. | |
| 7,194,069 B1 * | 3/2007 | Jones et al. | 379/88.02 |

OTHER PUBLICATIONS

The Nato Alphabet, http://www.die-marine.de/english/alpha_e.html.

* cited by examiner

*Primary Examiner*—Huyen X. Vo
(74) *Attorney, Agent, or Firm*—Stolowitz Ford Cowger LLP (57) ABSTRACT

Techniques for presenting a key to a human across a human-machine interface include receiving key data that indicates a key to be input to a target process. The key is reversibly converted to a first human-language statement. The human language statement is designed so that multiple variations in the human-language statement due to common human errors can be correctly reversed to regenerate the key data. The common human-language statement is presented to a human user for use in the target process. After receiving input data that indicates a second human language statement based on human memory of the first human language statement, the second human language statement is corrected for common human language errors. The corrected second human language statement is then converted to second key data and sent to the target process. Thus multiple human inputs are accepted and correctly converted to the key for the target process.

29 Claims, 5 Drawing Sheets

TECHNIQUES FOR PASSING DATA ACROSS THE HUMAN-MACHINE INTERFACE

BACKGROUND OF THE INVENTION

1. Field of the Invention

The present invention relates to the human-machine interface; and, in particular to presenting key data for subsequent human use as input to a process, in which the key data is presented to the human in a form that is more resilient against human entry error than previous approaches.

2. Description of the Related Art

A computer user is often required to input product codes or Internet Protocol addresses to one or more programs which that user employs on a computer system. This task can be daunting when the user has no concept of the meaning of the data. This situation arises, for example, when an unsophisticated network subscriber is asked to configure a network device with an Internet Protocol (IP) address, or a more sophisticated user is asked to input a long string of characters as a product code. Without a context, the series of characters appears (or is) random and is difficult to remember or enter correctly, or both. For example, a person's relative who has just installed a wireless router in her home, finds it difficult to remember to set an IP address of 192.168.1.1 for one of the devices on the network. Several errors are likely to be introduced, such as entering 198.162.11, any one of which is sufficient to prevent successful performance of a desired task.

In a previous approach some computer processes use one or more key words to make it easier for a human user to remember information. For example, AmericaOnLine (AOL) of Dulles, Va. allows users to have passwords made of words rather than random letters and numbers and special characters. While suitable for some purposes, this approach still suffers from failure if even one of the words is mistyped or presented out of order. Only one entry suffices, every variation, no matter how easy to make or how common its occurrence, leads to failure.

Based on the foregoing there is a clear need for techniques to provide human users with forms of key data to enter in a computer system or process, which forms are resilient against common variations that may occur upon human entry, including the effects of mistaken memory and inarticulate operation of an input device (e.g., typographical errors).

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Techniques are described for presenting a key data to a human for subsequent input to a machine process. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In the following, embodiments of the invention are described in the context of an English phrase to help a user remember an IPv4 address as a key to be entered while configuring a networking device. However, the invention is not limited to this context. In various other embodiments, the language is a non-English language or the key is an IPv6 address, a serial number, a product code, a port number, a time stamp, a birth date, a personal identification number (PIN), a social security number, or an authorization key, among others.

1.0 Functional Overview

Figure 1:
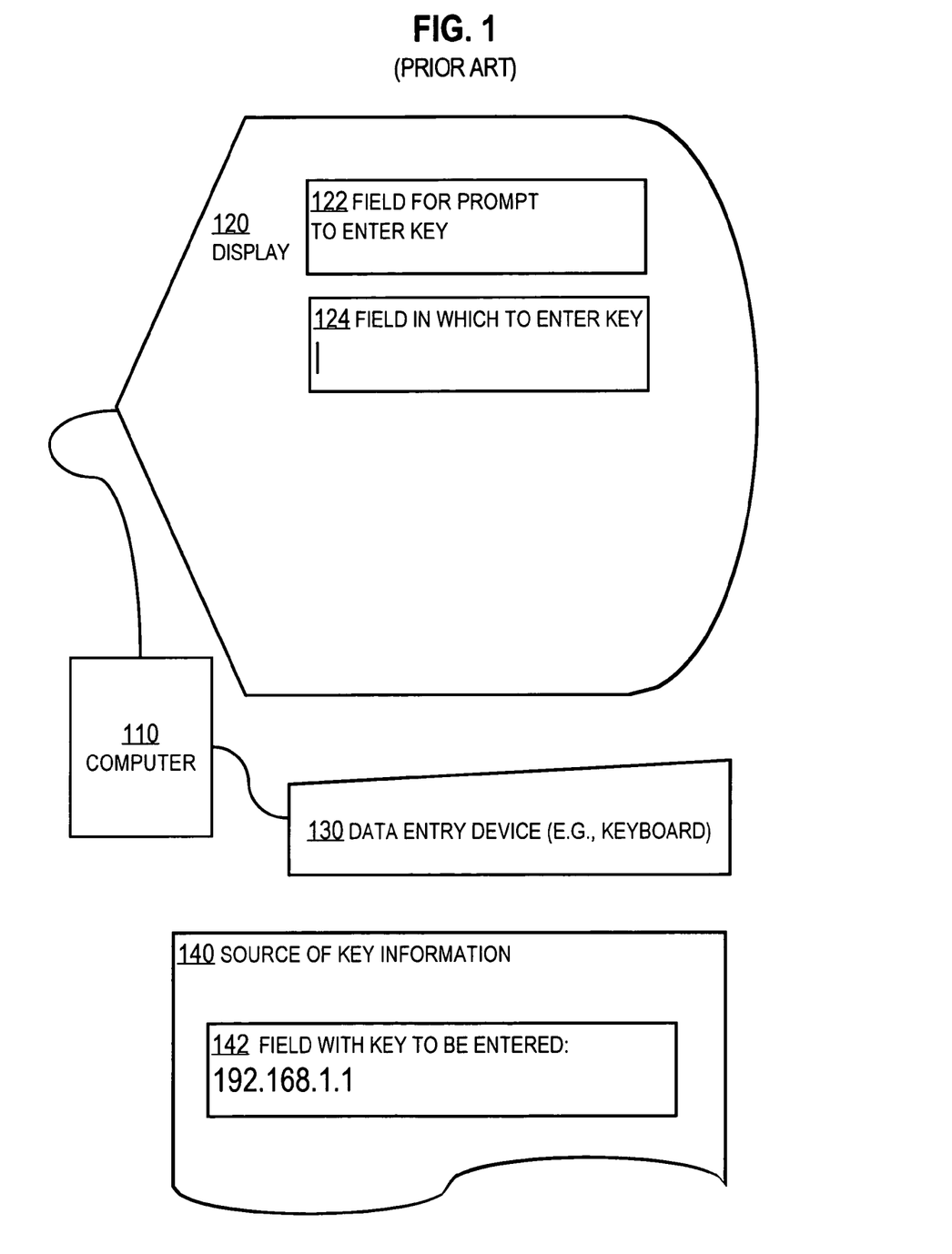
FIG. 1 is a block diagram that illustrates human interfaces involved in learning and using a key for a computer process.

FIG. 1 is a block diagram that illustrates human interfaces involved in learning and using a key for a computer or other machine process. A computer-human interface includes a computer 110 in communication with a display 120 and a data entry device 130, such as a mouse or keyboard. Also shown in FIG. 1 is a source 140 of key information.

In a typical interaction, a human user of computer 110 receives a prompt to enter some data. In the illustrated embodiment, the prompt takes the form of a prompt field 122 on the display with words or symbols indicating the user of computer 110 is to input some value, called herein a key. Any combination of letters, numbers and symbols may constitute a key. An Internet Protocol (IP) version 4 (IPv4) address is constituted of four binary octets (an octet is 8 binary digits called bits). An octet can represent decimal numbers from 0 through 255. A common representation of an IPv4 address is four decimal values in the range 0 through 255 separated by dots, e.g., 192.168.1.1.

In this typical interaction, the user of computer 110, positions a cursor in field 124 in which to enter the key, using the data entry device 130, and types in the characters that make up the key. The user typically obtains the character string used as the key from another source, such as another computer system.

In FIG. 1, it is assumed that the source 140 of the key information is a sheet of paper with printing, such as a letter received from a vendor or a relative, or a printout of an email received. In some embodiments, some or all of the source is auditory, involving spoken sounds. Within the source 140 is a field 142 in which is presented the characters of the key to be entered in field 124. In the illustrated example, the IPv4 address "192.168.1.1" of a private network is shown in field 142.

A user of computer 110 who is uninformed about IPv4 address use or meaning may find the address difficult to remember and is likely to transpose numbers or misplace dots. Any change at all between the characters shown in field 142 and the data entered in field 124 will cause the process that caused the prompt 122 to do something different than intended, including doing nothing or doing something harmful. The situation is not much better if words are used for the key, such as in a wired equivalent privacy (WEP) passphrase used in encryption over wireless networks. Any deviation from the phrase causes failure in the wireless data transfer.

Figure 2:
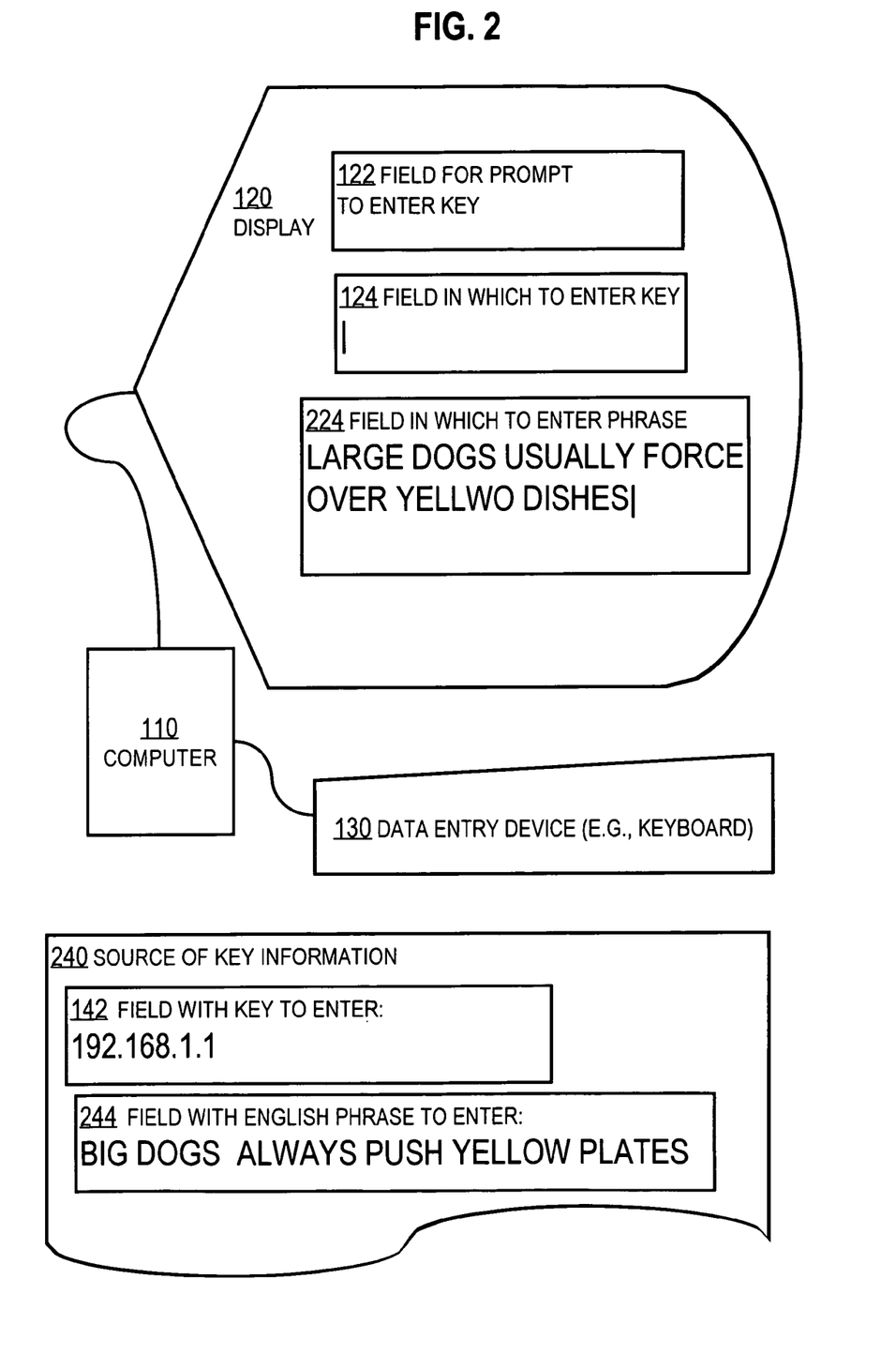
FIG. 2 is a block diagram that illustrates human interfaces involved in learning and using a key for a computer process, according to an embodiment.

Although a computer 110 is depicted in FIG. 1 and FIG. 2 for purposes of illustration, in other embodiments, computer 110 is replaced by another device that requires human input of a key made up of a series of characters or numbers or both, including telephones, personal digital assistants, network devices, microwave ovens, automobiles, among other items too numerous to list.

According to embodiments of the invention, a source of key information provides in addition to (or instead of) the key itself, a human language statement that is resilient against common human memory and input errors, including many typographical errors, and partial data loss. As used herein, a human language statement includes fully or nearly grammatically correct language word combinations, phrases, sentences, and paragraphs. A complementary inverse process executing on the computer receiving the human entered version of the statement is able to decode the correct key characters in many cases. Human language statements are more readily processed by the human partner of the human-machine interface, and many language-based errors are possible to anticipate and catch. For example, misspellings that are not words are likely typographical errors that are close to an intended word, synonyms are likely used interchangeably with an intended word, and homophones and similar appearing words are more likely inserted for an intended word than completely unrelated words. Word order is more likely swapped than leaving out a strong subject or predicate concept. Word misplacements are usually limited to one place, not several places. In addition, error correcting codes (ECCs) are used in some embodiments to further correct for some errors, as explained in more detail below The effect of a language-based error-resistant code on entering key information to a computerized process is demonstrated in FIG. 2. FIG. 2 is a block diagram that illustrates human interfaces involved in learning and using a key for a computer process, according to an embodiment. In FIG. 2, computer 110, data entry device 130, display 120, field 122, field 124, and field 142 are as described above in FIG. 1. Source 140 of FIG. 1 is now replaced by source 240 of key information.

In the illustrated embodiment, display 120 includes field 224 in which to enter a phrase associated with the key. Source 240 includes field 142 and field 244. Field 244 holds characters that represent an English phrase. The phrase is "BIG DOGS ALWAYS PUSH YELLOW PLATES," a vivid language image that a user is likely to remember to some extent. If this phrase is entered exactly into field 224, a process on computer 110, which is the inverse of the process that produced the phrase, will exactly derive the associated key, "192.168.1.1," as with other approaches. However, the inverse process on computer 110 will also derive the associated key "192.168.1.1" for a large number of variations, including the phrase entered into field 224 in the illustrated embodiment, "LARGE DOGS USUALLY FORCE OVER YELLWO DISHES." Note that the entered phrase includes a misspelling "YELLWO", substitution of synonyms LARGE for BIG, FORCE for PUSH, substitution of a similar word USUALLY for ALWAYS, and insertion of an extra word OVER.

Figure 3:
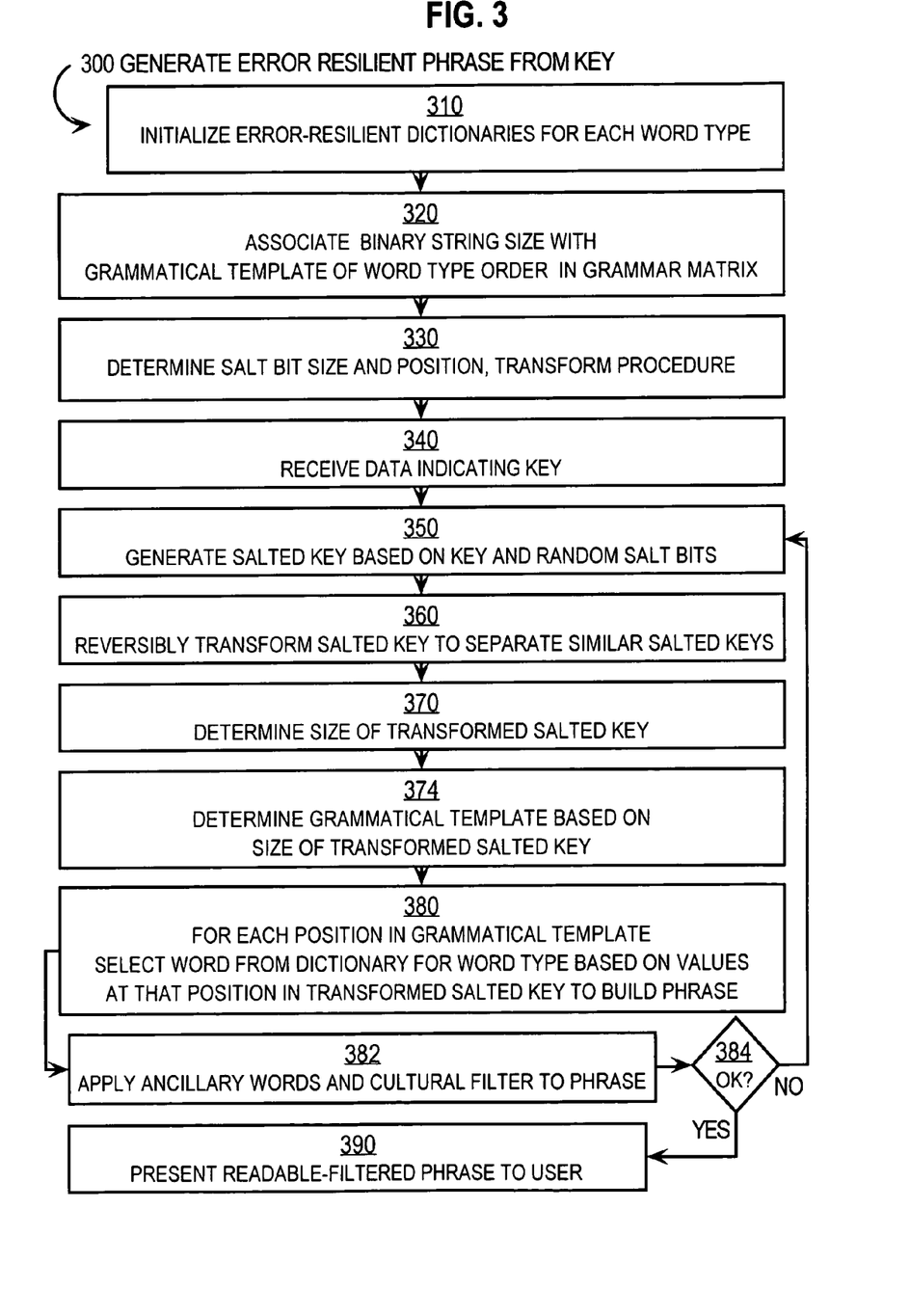
FIG. 3 is a flow diagram that illustrates a method for encoding a particular key for a computer process as a resilient human language statement, according to an embodiment.

A process for generating a resilient statement, such as shown in field 244, from the key "192.168.1.1" for an illustrated embodiment is described in more detail in FIG. 3. The process for deriving the key "192.168.1.1" from the erroneous but related statement, such as shown in field 224 for the illustrated embodiment, is described in more detail with respect to FIG. 4.

2.0 Encode Method to Generate Human Statement from Key

Figure 4:
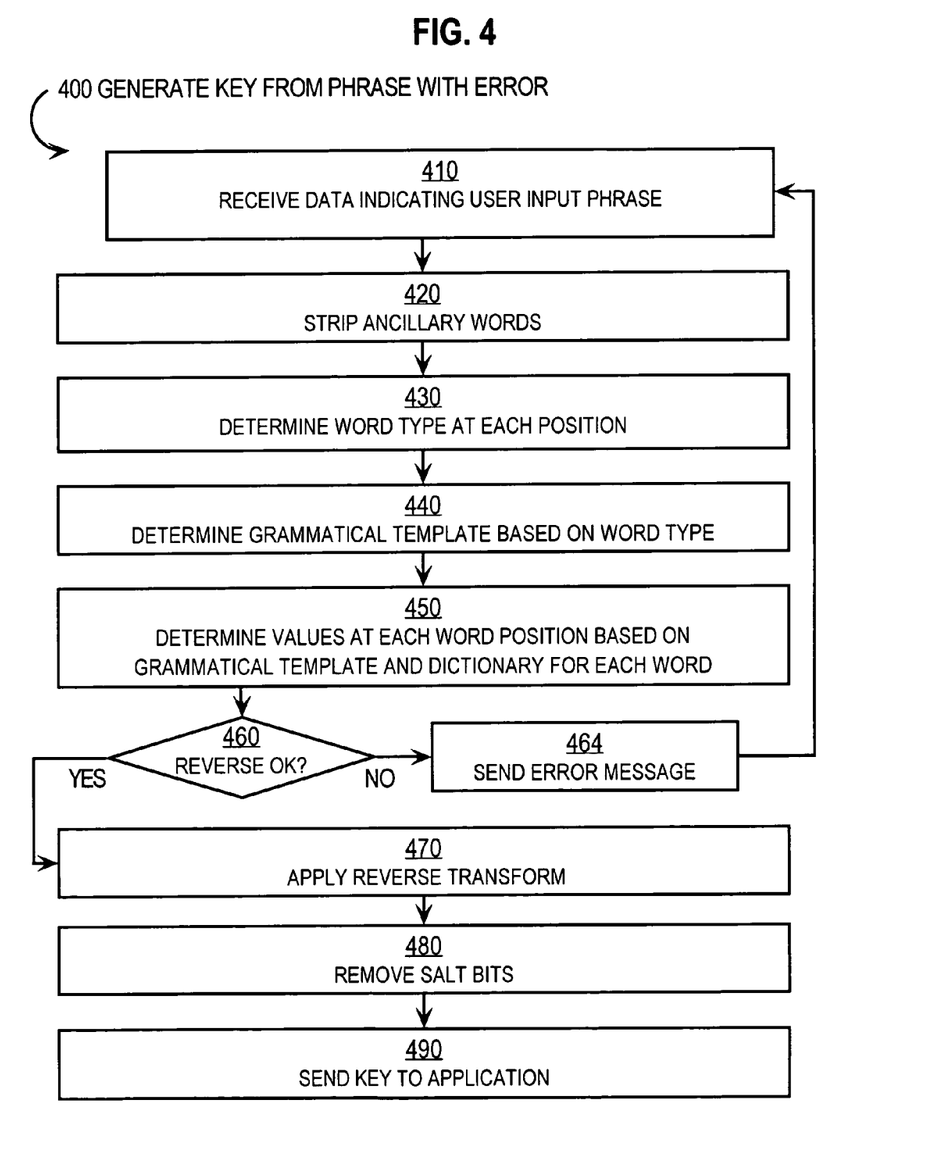
FIG. 4 is a flow diagram that illustrates a method for decoding variations in a resilient human language statement to a particular key for a computer process, according to an embodiment.

FIG. 3 is a flow diagram that illustrates a method 300 for encoding a particular key for a computer process as a resilient human language statement, according to an embodiment. Although steps are shown in FIG. 3 and FIG. 4 in a particular order for purposes of illustration, in other embodiments one or more steps are performed in a different order, or overlapping in time by one or more processes running in series or in parallel, or one or more steps are omitted, or the method is changed in some combination of ways.

In step 310, human error-resilient dictionaries are developed for each grammatical word type. As used herein, a grammatical type indicates a class of words that are interchangeable in a particular role in a grammatical sentence. Any level of granularity may be used to categorize grammatical word types. For example, in some embodiments the word types for which a dictionary is developed are noun, verbs and words that fit neither role are considered ancillary words. In an illustrated embodiment, the grammatical types of words are nouns, adjectives, adverbs, and verbs. In still other embodiments, verbs are separated into transitive, intransitive and coupling types and nouns are separated into ordinary, proper and trade name types. Further granularity in some embodiments involve verbs of different tenses as different grammatical types. In the illustrated embodiment, ancillary words not included in dictionaries include pronouns, definite and indefinite articles, coupling words, and prepositions.

To guard against human errors in which related words are substituted for each other, the dictionary for a grammatical type is limited to a discreet number of separable concepts that are as distantly related as possible. A representative word is chosen for each separable concept. Associated with each separable concept is a list of closely related words. In some embodiments, all related words are explicitly listed. In other embodiments, representative related words are explicitly listed, but multiple alternate forms of the same word are deduced, such as plural forms, regular conjugated forms of a base verb, gender and case-dependent forms, among others. In some embodiments, related word include misspellings that are closer to the words in the current concept than to a word in a different concept, antonyms, homophones and words similar in appearance (such as "one," "own," "won"). Some related words are deduced using other measures of similarity. One common measure of similarity in sound is provided by the SOUNDEX algorithm, well known in the art of census names. In some embodiments, words similarly far from two representative words for two separable concepts are not included. It is desirable that the representative words be common and memorable in the language of the user.

To translate between binary representations of keys and words in the dictionary, the number of separable concepts in the dictionary for any one grammatical type is a power of two. The size of the dictionary then corresponds to a particular number of bits; e.g., 256 entries correspond to eight bits. It is a relatively straightforward matter to divide all English nouns into 256 separable concepts with minor overlap of synonyms, antonyms, homophones, etc. The overlapping words are eliminated from the dictionary. Each separable concept in the dictionary then is associated with one of the values between zero and the power of two minus one (e.g., 0 and 255 for the 256 separable concepts in the example). The value serves as an index into the dictionary. All words associated with the concept have the same value. Different grammatical types of words can have dictionaries of different powers of two, e.g., in some embodiments there are 256 nouns and 256 adjectives but only 128 adverbs and 128 verbs.

Any method may be used to generate the separable concepts and the lists of associated words. In some embodiments, the user's native language is filtered through a set of semantic and syntactic constraints. Any constraints can be used to determine which words are associated with the concept and therefore have the same binary value as the concept.

For example, in various embodiments, any combination of the following constraints are applied;

1] limit a number of characters;
2] include iconic proper nouns, i.e., proper nouns known to most speakers of the language, not obscure places or person names (e.g., Mary, Bob, Washington, Dallas)
3] collapse homophones to the same concept (e.g., pair, pear, pare).
4] collapse similar sounding words (e.g., same SOUNDEX code) to the same concept;
5] collapse words which are spelled the same (e.g., the verb peer and the noun peer) to the same concept;
6] collapse words that are spelled similarly or look the same (e.g., own, won) to the same concept;
7] collapse synonyms and antonyms, such as determined from a Thesaurus (e.g., good, nice, fine, bad, nasty, etc.) to the same concept;
8] collapse words that appear similar in other codes to the same concept; (For example, words with the same T9 code are grouped. The T9 code for a word is a series of numbers, wherein each number is associated with three or more letters as labeled on a telephone keypad.)
9] collapse to the same concept rhyming words;
10] collapse to the same concept slang versions.

In some embodiments meta-semantics combine certain words to create different concepts, like "telephone number" and "internet address." Meta semantics also strongly associate words, so that President is more strongly tied to capital than to court. After groupings are complete, a representative word is selected for each group and the representative words are sorted into grammatical type to any level of granularity desired.

In one embodiment, all main entries in a thesaurus are mapped and other words are given coordinates in terms of their distance from these major words in terms of how many synonyms and synonyms are used to relate the two words, if at all. The space is then divided into the number of separable concepts desired for the dictionary (e.g., 256) to define the separable concepts. The words farthest apart are chosen as concept representatives. Words are then grouped by distance from the concepts. The words associated with a concept are determined by keeping only a certain percentage of the synonyms closest to a concept, e.g., 25%. Again any word still appearing in association with more than one concept is removed to remain in no more than one concept for one grammatical type.

For purposes of illustration, it is assumed that there are four grammatical types: nouns, adjectives, verbs, and adverbs and that only transitive verbs are included in the verbs dictionary. It is also assumed that each dictionary has 256 entries. Example concepts and associated words for each grammatical type are listed in table 1.

TABLE 1a

Example concepts and associated words in first permutation of noun dictionary.

| Index | Concept | Associated words |
|---|---|---|
| ... | | |
| 85 | dog | dogs, dg, odg, dgo, pup, puppy, spaniel, ... |
| ... | | |
| 132 | plate | plates, pltes, paltes, dish, dishes, dsh, saucer, ... |
| ... | | |

TABLE 1b

Example concepts and associated words in first permutation of adjective dictionary.

| Index | Concept | Associated words |
|---|---|---|
| ... | | |
| 83 | big | bgi, ibg, large, lrge, lage, huge, uge, hge, vast, heavy ... |
| ... | | |
| 215 | yellow | yllo, yello, yllwo, yellwo, lemon, canary, saffron ... |
| ... | | |

TABLE 1c

Example concepts and associated words in first permutation of verb dictionary.

| Index | Concept | Associated words |
|---|---|---|
| ... | | |
| 55 | eat | eats, ate, eating, eaten, feed, lunch, dine, sup, feast ... |
| ... | | |
| 170 | push | psh, upsh, psuh, pshu, force, frcoe, frce, press, prss, ... |
| ... | | |

TABLE 1d

Example concepts and associated words in first permutation of adverb dictionary.

| Index | Concept | Associated words |
|---|---|---|
| ... | | |
| 84 | always | alwys, eternally, often, usually, never, rarely, ever ... |
| ... | | |
| 210 | loudly | ldly, noisily, nsyly, quietly, gaudily, ... |
| ... | | |

In some embodiments, there are two or more versions of one or more of the dictionaries. For example, there are two versions of the noun dictionary. In one version, the concepts are in a first order (e.g., alphabetical) and in the second version the concepts are in a different order (random or other non-alphabetic order). As is described in more detail below, this is done in some embodiments to add variability to the phrases and reduce the chances of certain error. Thus, in such a second table, the noun "dog" will have a different value from the value 108 it has in the example of Table 1. Example second permutations of the noun and adjective dictionaries are listed in Table 1.e and 1.f.

TABLE 1e

Example concepts and associated words in
second permutation of noun dictionary.

| Index | Concept | Associated words |
|---|---|---|
| ... | | |
| 35 | plate | plates, pltes, paltes, dish, dishes, dsh, saucer, ... |
| ... | | |
| 222 | dog | dogs, dg, odg, dgo, pup, puppy, spaniel, ... |
| ... | | |

TABLE 1f

Example concepts and associated words in second
permutation of adjective dictionary.

| Index | Concept | Associated words |
|---|---|---|
| ... | | |
| 69 | yellow | yllo, yello, yllwo, yellwo, lemon, canary, saffron ... |
| ... | | |
| 203 | big | bgi, ibg, large, lrge, lage, huge, uge, hge, vast, heavy ... |
| ... | | |

The dictionary data is shared with the decoding process.

In step 320, a binary string size is associated with each grammatical form for a statement in the language. A grammatical form, also called a grammatical template herein, is an ordered series of grammatical types of words used to construct a statement. For example, a simple statement (with transitive verbs) is a three word statement consisting of noun (subject) verb (predicate) noun (object). A binary length is associated with the statement of this form since each grammatical type is represented by a certain number of bits. Thus, in the example of 256 (8-bit) nouns and 256 verbs, the simple statement grammatical form of noun-verb-noun represents 8×3=24 bits.

In the illustrated embodiment, the IPv4 key is four octets. Thus a four word grammatical form is desirable to represent an IPv4 address in some embodiments with 8 bit words, like the illustrated embodiment. There are several possible four word forms in English, such as noun-adverb-verb-noun; and noun-verb-adjective-noun; and adjective-noun-verb-noun. As is described in more detail below, however, in the illustrated embodiment some bits are added to the four octets as a result of applying an error correction code transform or salt bits or both. Thus more than four 8-bit words are needed to represent that binary string. The list of binary string lengths and associated grammatical forms for an example grammar matrix are shown in Table 2.

TABLE 2

Example grammar matrix

| entry number | Size range (octets) | Grammatical form of human language statement |
|---|---|---|
| 0 | 0 to 2 | noun-verb |
| 1 | 2 to 3 | noun-verb-noun |
| 2 | 2 to 3 | adjective-noun-verb |
| 3 | 2 to 3 | noun-verb-adverb |
| 4 | 3 to 4 | adjective-noun-verb-noun |
| 5 | 3 to 4 | adjective-noun-verb-adverb |
| 6 | 3 to 4 | adjective-noun-verb-noun |
| ... | ... | ... |

TABLE 2-continued

Example grammar matrix

| entry number | Size range (octets) | Grammatical form of human language statement |
|---|---|---|
| 10 | 4 to 5 | adjective-noun-verb-adverb-noun |
| ... | ... | ... |
| 14 | 5 to 6 | adjective-noun-adverb-verb-adjective-noun |
| ... | ... | ... |

The grammar matrix is useful when the key to be converted to human language can have multiple different lengths. In some embodiments, all the keys to be converted have the same length. For example all IPv4 addresses used as keys have the same length, even after adding salt bits and performing an error correction code transform in some embodiments. Thus a single grammatical form is used for all IPv4 addresses to be converted in these embodiments (e.g., entry 14). In some of these embodiments, step 320 includes only determining a single grammatical form for all keys (e.g., grammatical form: adjective-noun-adverb-verb-adjective-noun); and further steps to determine size and select a grammatical form for a particular key, described below with reference to step 370 and step 374, are omitted. The grammar matrix is shared with the decoding process.

In step 330, the number and location of salt bits are determined. The value of each salt bit (whether 0 or 1) is unrestrained and is chosen at random. In some embodiments the salt bits are used to pad the length of a binary string to bring the string length to a whole multiple of word sizes, e.g. a whole number of octets. The salt bits also provide variations on the same input, which are useful in finding an appropriate statement. For example, some phrases produced may be too similar to a phrase produced by another key or may violate social norms or some other measure of suitability for a purpose. By choosing another random set of values for the salt bits a substantially different phrase is generated, in some embodiments.

In step 330 a transform procedure is also determined. The transform operates on a first binary string and outputs a second binary string. The transform is reversible, i.e., there is a known inverse transform that outputs the first string when the second string is input. In some embodiments, the transform is null so that the output string is the same as the input string. However, there are several transforms that have properties useful when accounting for human use and human errors.

One useful property is that similar inputs to the transform produce very different outputs. This property is useful for several reasons. One reason is that subsequent uses of the encoding may operate on similar inputs, e.g., two IP addresses may be very similar because they are on the same subnetwork, such as 192.168.1.1 and 192.168.1.12. Because the two addresses may have different uses in the target process, it is often desirable that they be represented with very different phrases. Another reason is that changing a few salt bits to find a more suitable phrases might only change one word without a transform to ensure that a little change makes a big difference in the output binary string. There are many methods known in the art to reversibly transform similar input strings to produce very different output strings. For example, a pseudo-random number generator inputs a seed value and outputs a random number unrelated to that seed; however, the same seed produces the same random number every time. A table of random numbers produced by each seed can be used as an reversible transform. The table can be reasonably small by restricting the number of bits input, e.g., restricting to eight bits would produce a table with 256 entries. The output would be totally different by including a salt bit within each eight bits fed to the random number generator.

Another useful property of a transform is to detect or correct at least some errors. For example, if the forward process sets a parity bit, then the reverse process could distinguish a binary string in which the parity is incorrect as one that was not produced by the forward process and is therefore in error. Error correction processes can not only detect errors but correct them if the error is limited to fewer than a threshold number of bits.

There is a class of transforms called Error Correcting Code (ECC) transforms that are very useful as the transform in some embodiments. Well known ECC transforms include the irregular repeat accumulator (IRA), Turbo codes including ARA, ARAA and AARP, and Convolution Accumulate-M ($CA^m$), among others, well known in the arts. A fully punctured ECC transform also provides the property that nearby input values are transformed to very different output values. Especially useful are binary symmetric channel codes, such as the Hamming Code. At the time of this writing, a reference for the IRA is the file Brest00.pdf in the directory publications of the domain mceliece.caltech.edu of the public World Wide Web (www); a reference for the Turbo codes is the file turbo.html in the directory ~mvalenti of the domain cs.wvu.edu of www; a reference for $CA^m$ is the file chap3.pdf of the directory ~pfister/thesis of the domain epfl.ch of lthcwww; a reference for ECC in general is the document Error_correcting_code in the directory wiki of the domain en.wikipedia.org; and a reference for Hamming is the file Hamming_code in the directory wiki of the domain en.wikipedia.org; the entire contents of each of which are hereby incorporated by reference as if fully set forth herein.

The number and location of salt bits and the transform procedure are shared with the decoding process. Step 310, step 320 and step 330 complete an initial process, e.g., a configuration of the encoding and decoding steps to be applied in the following steps. These selections may be performed in any manner known in the art, from explicit coding of certain algorithms to encoding of several with variables representing the various parameters, and specifying parameter values during initialization.

In step 340, data is received that indicates a key to be input by the human to a target process. For example, a private IP address is received for input during configuration of a network device.

In step 350, the key data is turned to binary data and salt bits are added. Any method may be used to convert the key to binary data, as long as the complementary process is used during decoding. For example, the IPv4 address is binary at the start and need not be converted to binary at all. However the conversion to decimal character representation (Arabic numerals and dots) can also be represented by binary codes for each character, e.g., using the American Standard Code for Information Interchange (ASCII) character code. This results in a very different and much longer binary string. Some serial numbers and product codes mix numeral and letter characters and are more naturally converted to binary using the character codes. For purposes of illustration, it is assumed that the four octets of the IPv4 address constitute the binary representation of the key. Thus the address 192.168.1.1 is represented by the 32-bit binary string

11000000101010000000000100000001

This is called the binary key.

In step 350 the salt bits are also added, if any, to form the salted key. A few salt bits suffice for the purpose. In some embodiments all salt bits are added as a contiguous block, such as at the beginning or end of the string. It is assumed for purposes of illustration that four salt bits are inserted, one after every seven original bits, so that there is a salt bit every eight bits of the resulting binary string, the salted key. The position of the salt bits are indicated in the following string by the letter x, and the salted key is now 36 bits.

1100000x0101010x0000000x0010000x0001

Inserting random values 0110 for the four salt bits gives the following binary string as the example salted key.

110000000101010100000001001000000001

In step 360, the reversible transform is applied. If necessary, the salted key is padded to produce an input of proper size for the transform. The salted binary key is input to the chosen reversible transform to produce a transformed salted binary key. In an illustrated embodiment an ECC transform is used. It is assumed for purposes of illustration that the ECC transform works on blocks of eight bits, so that the 36-bit salted key is padded with four bits. The size and the location of the padding are shared with the decoding process. For example, it is shared between encoding and decoding that all IPv4 addresses are 36 bits after salting and that 4-bit padding is added at the end of the string. In some embodiments, the padding is all zero bits; in some embodiments the padding also uses random bits. It is assumed for purposes of illustration that the salted key is padded with the same four bits used for the four salt bits, e.g., 0110. The resulting 40-bit padded salted key is as follows.

1100000001010101000000010010000000010110

It is assumed that the reversible transform adds seven parity bits and produces the following 47-bit transformed salted key.

01010011010101010101001010101001001010100011

In step 370 the length of the transformed salted key is determined. For example, it is determined that the above transformed salted key has 47 bits. In some embodiments all keys are the same size and the size of the transformed salted key is always the same. In some such embodiments, step 370 is omitted. For example, in some embodiments in which all keys are IP addresses, the size of the transformed salted key is known to be 47 bits and step 370 is omitted.

In step 374 a grammatical form to use as a template for the human language statement is determined based on the length of the transformed salted key. For example, a transformed salted key length of 47 falls between five and six octets. In the example grammatical matrix of Table 2, the $14^{th}$ grammatical form applies to binary strings of such size. This form is adjective-noun-adverb-verb-adjective-noun. When there are multiple grammatical forms to use as a template for a given length, one of the many alternatives is selected, and the manner of selection is shared with the decoding process. In some embodiments the grammatical matrix is culled to leave only one form per binary string length. In some embodiments, the different forms are alternated based on the number of sentences in the statement. For example, if the longest form accommodates seven octets, a 10-octet string would have a first sentence in a form for 7 octets and 3 octets left for the second sentence. The 3-octet form for the second sentence is then the second of the 3-octet forms listed in the grammar matrix, as shown in Table 2.

In some embodiments all keys are the same size and the grammatical form is always the same. In some such embodiments, step 374 is omitted. For example, in some embodiments in which all keys are IP addresses, the grammatical form is always the 14$^{th}$ in Table 2, and step 374 is omitted.

In step 380, each grammatical type of word, in order, in the grammatical form selected as the template for the current statement consumes the number of bits associated with the dictionary size for that type. Any order may be used; and that order is shared with the decoding process. For purposes of illustration, it is assumed that the order is from leftmost (most significant bit) to rightmost (least significant bit). The bits consumed by a word type are used as an index into the dictionary. In some embodiments, when a grammatical type of word is repeated in the template, the second use of the grammatical type uses an alternative permutation of the dictionary in which the words are in a different order and therefore have a different index. Thus in the example, the adjective and noun forms are used twice in the grammatical form selected as a template; therefore the second occurrence of those grammatical types use the alternative permutation of the dictionary. An example of the words at the indexes into the dictionaries generated by the example transformed salted key is given in Table 3.

TABLE 3

Example dictionaries and words indexed by an example transformed salted key.

| Portion in transformed salted key | bits in portion | index | dictionary | concept representative word |
|---|---|---|---|---|
| 1 | 01010011 | 83 | adjective | BIG |
| 2 | 01010101 | 85 | noun | DOG |
| 3 | 01010100 | 84 | adverb | ALWAYS |
| 4 | 10101010 | 170 | verb | PUSH |
| 5 | 01000101 | 69 | adjective - 2nd | YELLOW |
| 6 | 0100011 | 35 | noun - 2nd | PLATE |

Since the sixth portion only has seven bits, for the illustrated embodiment operating only on IPv4 addresses, the sixth index will not be greater than 127, this is effectively padding the short 6th portion with a 0 in the most significant bit. In some embodiments a short portion is padded with zeroes in the least significant bit. This effectively multiplies the value in the sixth portion by 2 and can produce a maximum value of 254.

As a result of step 380, a human language statement is generated from a key. With a different value of the salt or padding bits or both, a different human language statement is generated from the same key.

In step 382, the human language statement from step 380 is reviewed and modified under some conditions. For example, case, gender, number, and tense rules are tested. If a violation is found, an alternative word of the same concept is substituted to avoid the violation if possible. In the illustrated example, the subject is singular and the verb is plural. Thus during step 382, a substitution is made to provide agreement. For example, the plural form "dogs" of dog is selected from the words associated with dog in the noun dictionary data (Table 1a or Table 1e). Ancillary words, such as articles, prepositions and pronouns are added to make the statement more natural. For example, the article "a" may be added in front of "plate" to make a more readable form of the statement "Big dogs always push a yellow plate." In the illustrated embodiment, the article is omitted but plate is made plural. The statement becomes "Big dogs always push yellow plates."

In some embodiments, one or more cultural or other checks are made. It is assumed for purposes of illustration that previous, different values in the salt and padding bits yielded the statement, "Fat President silently kills local person." This statement would probably be considered unseemly and disrespectful to an important institution, and may be unpleasant to the user. An attempt is made to find substitutes for these representative words that generate a more seemly statement. Control passes to step 384.

In step 384, it is determined whether checks and fixes applied during step 382 removed the objectionable characteristics of the statement. In some embodiments, step 384 involves input from the human user, so that the human user can apply subjective taste to the determination of suitability of the statement. If it is determined in step 384 that the best statement for the current values of the transformed salted key binary string is still linguistically awkward or culturally unseemly, control passes back to step 350 to generate and insert different salt bits. In some embodiments, steps 370 and 374 to determine size and grammatical form are not performed again during the second pass from step 350.

For example, with the previous value of the salt bits, the statement "Fat President silently kills local person" is produced and even after several substitutions leaves "Big senators loudly erase neighboring men." The human user rejects these statements and control returns to step 350 to use different random values for the salt bits.

If it is determined in step 384 that the objectionable characteristics have been removed, control passes to step 390. In some simple embodiments, step 382 is omitted, and control passes directly to step 390.

In step 390, the resulting statement, called a presentable statement, is actually presented to the user as the human language statement that regenerates the key even with common human errors. In the illustrated example, after the second pass through the steps in which the salt bits 0110 are used, the presentable phrase is BIG DOGS ALWAYS PUSH YELLOW DISHES, as shown in field 244 of printout 240.

3.0 Decode Method to Derive Key from Human Statement

At some time hours, weeks or months later, the human user is prompted to enter the key. For example, an unsophisticated network user is asked to configure a network device with the IPv4 address provided earlier. The user supplies to an appropriate input field an imperfectly remembered or imperfectly typed statement, or both, associated with the requested key. For example, the human user types in the phrase "LARGE DOGS USUALLY FORCE OVER YELLWO DISHES," as shown in field 224 in FIG. 2. The decoding process is still able to generate the correct IPv4 address, e.g., 192.168.1.1, in many cases, as is shown next with reference to FIG. 4.

FIG. 4 is a flow diagram that illustrates a method 400 for decoding variations in a resilient human language statement to a particular key for a computer process, according to an embodiment. In step 410, data is received indicating the human language statement input by the human user. The entered statement is a character string that is typically imperfectly remembered or imperfectly typed, or both. For example, the character string "LARGE DOGS USUALLY FORCE OVER YELLWO DISHES" is typed by the unsophisticated user of a network device.

In step 420, ancillary words are stripped off to produce a stripped statement. As used here, an ancillary word is a word that does not appear in the dictionaries, including both representative words and associated words for each concept. Thus, in the illustrated embodiment, definite and indefinite articles, pronouns and prepositions are stripped off from the type input statement. The non-word "yellwo" is not stripped off, because it does appear in the dictionary data as an associated (misspelled) variation of the word "yellow" in the adjective dictionaries. It is assumed for purposes of illustration that "over" is in the dictionary data as an adverb, to modify a verb to indicate where an action takes place, such as to knock something over. Over is also a preposition, and in some embodiments, "over" is not included as an adverb; and in some such embodiments "over" is removed during step 420. In the illustrated embodiment, after step 420, the stripped statement is the same as the originally input statement "LARGE DOGS USUALLY FORCE OVER YELLWO DISHES."

In step 430 a word type is determined for each position in the stripped statement. For example the word types discovered for the seven remaining words, based on the dictionaries in which the word was found is the sequence: adjective-noun-adverb-verb-adverb-adjective-noun.

In step 440, a grammatical form used as a template for mapping words to binary strings is determined based on the word type sequence, e.g., the number and sequence of different word types. For example a 7-octet grammatical form with the type sequence adjective-noun-adverb-verb-adverb-adjective-noun is searched for in the grammar matrix. This association can be made in any manner. It is assumed for purposes of illustration that the only 7-octet form is adverb-adjective-noun-adverb-verb-adjective-noun, in which the first adverb modifies the first adjective. The number of different types of words match (two nouns, two adjectives, two adverbs and one verb), but the order is different. The first adverb in the grammar matrix form is in the first position and the second adverb is in the fourth position. In the stripped statement, the first adverb is in the third position and the second adverb is in the fifth. In some embodiments, the difference is considered allowable and a correction is made to move both adverbs to the correct positions. Thus an attempt is made to correct multiple-word errors, i.e., errors involving multiple words.

In some embodiments, word movement is confined to one place or swapping the position of two words, and the movement of the first adverb by two places to the beginning of the statement is not allowed. In such embodiments, another correction is made. For example, a word is dropped to bring the statement in conformity with the allowed grammatical form for a template. A dropped word results in a 6-octet statement for which the first occurrence of a 6-octet form in the grammatical matrix is allowed by an illustrated embodiment. For example, in Table 1, this is adjective-noun-adverb-verb-adjective-noun. This can be matched by dropping one of the adverbs and swapping the position of the remaining verb and adverb. These changes are considered allowable. In this embodiment, the grammatical form selected during step 440 is the 14$^{th}$ entry in Table 3.

It is noted that in embodiments in which there is only one known size for a key, there is a known size of the resulting statement and a known grammatical form for the template to change from grammatical words to binary strings. In such embodiments, step 440 is trivial, the known grammatical form is selected. The challenge occurs in step 450 to fit the stripped statement to the known form.

In step 450 a value is determined for each word position in the grammatical form used as a template based on the word of the statement associated with the position in the grammatical form, and the dictionary for each word type.

In the illustrated embodiment, the seven word statement is aligned with the six-word form by dropping one of the adverbs. In some embodiments the first out-of-position word type is removed (e.g., "over" is removed). In some embodiments, the next steps are done for both candidate adverbs ("usually" and "over") for the adverb third position in the form. For purposes of illustration, it is assumed that both adverbs are tried out in the third position of the selected grammatical form.

For the case in which "usually" is used as the adverb in the third position of the template, a binary string is produced as illustrated in Table 4. The grammatical form used as a template indicates six positions, corresponding to the different rows in Table 4. The known word types at those six positions are given in the next column. The dictionary known to be associated with each of the word types at those six positions is given in the next column. In the fourth column is listed the words associated with the six positions, using "USUALLY" as the adverb and ignoring "OVER" according to the process described above. The words in the fourth column are all listed variations of the concept representative word and can be replaced by the concept representative word or associated with the index of their location in the dictionary or both. In Table 4, the index is listed in the fifth column.

TABLE 4

Example values produced by mapping stripped statement words to a selected grammatical form.

| Position in grammatical form | word type in position for grammatical form | dictionary | word in position | index of concept that includes word | binary value of index |
|---|---|---|---|---|---|
| 1 | adjective | adjective | LARGE | 83 | 01010011 |
| 2 | noun | noun | DOGS | 85 | 01010101 |
| 3 | adverb | adverb | USUALLY | 84 | 01010100 |
| 4 | verb | verb | FORCE | 170 | 10101010 |
| 5 | adjective | adjective - 2$^{nd}$ | YELLWO | 69 | 01000101 |
| 6 | noun | noun - 2$^{nd}$ | DISHES | 35 | 0100011 |

For example, the first adjective "LARGE" is found in the first permutation adjective dictionary (e.g., Table 1b) at index 83. Thus the decimal value 83 is shown on the line with LARGE in Table 4. The octet representation of 83 is shown in the last column. Note that the value in the last column on the first line matches the binary value in the second column of Table 3 on the first line. Using the word in the fourth column of Table 4 and the dictionary in the third column of Table 4, the index in the fifth column is produced for every line. The resulting binary string portion is shown in the sixth column for each line. Note that the binary values match those in Table 3 for every line. Thus, the binary string of the padded transformed salted key formed during encoding has been reproduced during decoding. This is so, even though the human has substituted synonyms (LARGE and DISHES for BIG and PLATES, respectively), similar words (USUALLY for ALWAYS) and misspellings (YELLWO for YELLOW).

As can be seen, the steps 440 and 450 are capable of correcting for multiple-word errors by the human user who enters the human language statement for the target process, such as some word order and word number mistakes. At the same time, the dictionary data is capable of correcting single-word errors (common substitution and misspelling and mistyping).

In step 460 it is determined whether the reverse transform (also called herein the inverse transform) can be applied. If so, then control passes to step 470 to apply the reverse transform. If not, then control passes to step 464. For some transforms, an error in the binary string produced during step 450 can be determined, for example by parity bits that do not indicate the correct parity. Some transforms with detected parity errors can not be corrected, so it is determined during step 460 that conditions are not favorable for applying he reverse transform, and control passes to step 464. Some transforms can correct certain errors indicated by the parity bit. If the parity bit errors are correctable, then it is determined in step 460 that the reverse transform can be applied, and control passes to step 470. If the parity bit errors are not correctable, then it is determined in step 460 that the reverse transform should not be applied, and control passes to step 464. In some embodiments, it is determined whether to apply the reverse transform, based on applying the reverse transform and determining that the result is not valid. For example, if a binary string of the wrong length is produced or an invalid value is produced, e.g., all ones or all zeroes, then it is determined that the reverse transform can not be performed.

In some embodiments, errors in the binary string produced during step 450 are determined independently of the transform. For example, if a binary string of the wrong length or an invalid value (e.g., all ones) is detected, then it is determined in step 460 that the reverse transform should not be applied. In some embodiments, step 460 is omitted; and control always passes to step 470.

If it is determined in step 460 that the reverse transform should not be applied, then control passes to step 464. In step 464, the human user is prompted to re-enter a human language statement, because the previous statement could not be processed. Control then passes to step 410 to receive the new human language statement.

For example, in some embodiments, using the word "OVER" as the only adverb results in parity bit errors detected during step 460, but using the word "USUALLY" does not. In this case it is determined in step 460 to apply the reverse transform with the value obtained from "USUALLY," which does not lead to a parity error.

If it is determined, in step 460, that the reverse transform can be applied, then control passes to step 470. In step 470, the reverse transform is applied. For example the null transform is applied in some embodiment, the table of pseudo random numbers generated is looked up, or an ECC code is run to detect and correct one or more errors. Step 470 includes removing any padding bits added for the forward transform.

In the illustrated embodiment, it is determined in step 460 that the reverse transform can be applied to the bit string produced from the human language statement using "USUSALLY" as the adverb. The bit string is constructed by appending the bit values in Table 4 in order from most significant to least significant, to produce the following binary string.

0101001101010101010100101010100100001010100011.

After applying the inverse transform, which removes the parity bits, the binary string is the same as the padded salted key given above, namely

11000000010101000000010010000000010110.

The padding bits, if any, are also removed during step 470. In the illustrated embodiment the last four bits were padding bits. The values of the padding bits are not needed, only their positions. The removal of the padding bits gives

1100000001010100000001001000000001.

In step 480, the salt bits are removed. Recall that in the illustrated embodiment the salt bits were added after every seven original bits. Those positions are indicated by the x in the following patters -------x-------x-------x-------x----.

Removing these bits leaves the following bit string.

11000000101010000000000100000001.

This is the 32 bit string made up of the four octets that constitutes the IPv4 address of the original key. To see this, the decimal representation is given by the decimal value of (11000000), decimal value of (10101000), decimal value of (00000001) and decimal value of (00000001), which gives 192.168.1.1, the original key.

Control then passes to step 490. In step 490, the reconstituted key is sent to the target process. For example, in the illustrated embodiment, the 32 bit string above that corresponds to address 192.168.1.1 is sent to the network device configuration process on computer 110.

Thus the encoding and decoding methods described above produce a human language statement that is resilient against common human errors in terms of reproducing the correct key upon decoding.

4.0 Example Hamming Code Embodiment

A particular embodiment using Hamming code 7/4/3, a particular ECC, is described in this section. References for Hamming Code 7/4/3 are found in file node123.html in directory ~wdj/book of domain web.usna.navy.mil, an in file ecc.html in directory home/stg/pub/E of domain www.dcs.ed.ac.uk, the entire contents of each of which is hereby incorporated by reference as if fully set forth herein. For simplicity of illustration, it is assumed in the following that the dictionaries each have four words and thus consume two bits of a binary string. The complete dictionaries determined during step 310 are given in Table 5.

TABLE 5a

Hamming example 2-bit noun dictionary.

| Index | Concept | Associated words |
|---|---|---|
| 00 | Joe | John, Johan, Joseph, Jo, JoJo, . . . |
| 01 | Mary | Marie, May, Mayrie, . . . |
| 10 | dog | dogs, dg, odg, dgo, pup, puppy, spaniel, . . . |
| 11 | fish | fsh, ifsh, fihs, trout, dolphin, tuna, . . . |

TABLE 5b

Hamming example 2-bit adjective dictionary.

| Index | Concept | Associated words |
|---|---|---|
| 00 | distant | dstnt, distnt, idstent, remote, remte, rmtoe . . . |
| 01 | many | a lot of, several, . . . |
| 10 | silly | comic, happy, joyful, tragic, sad, . . . |
| 11 | dark | drk, black, osbscure, light, bright |

TABLE 5c

Hamming example 2-bit verb dictionary.

| Index | Concept | Associated words |
|---|---|---|
| 00 | ran | run, runs, runnig, jog, jogging, walked, walks, walking, . . . |
| 01 | ate | eight, eat, aet, chew, chewed, consume, consumed, . . . |
| 10 | jumped | jump, jmp, pounce, pounced, leap, leaped, lept, lurch, . . . |
| 11 | carried | carry, bear, bore, heave, heaved, . . . |

TABLE 5d

Example 2-bit adverb dictionary.

| Index | Concept | Associated words |
|---|---|---|
| 00 | quickly | quikly, rapidly, rpdly, speedily, . . . |
| 01 | kindly | kndly, ikndly, friendly, freindly, frendly, gently, . . . |
| 10 | loudly | lodly, luodly, ldly, blatantly, vociferously, . . . |
| 11 | cleverly | clvrly, celverly, slyly, intelligently, . . . |

The grammar matrix formed during step 320 is given in Table 6.

TABLE 6

Hamming example grammar matrix

| entry number | Size range (bits) | Grammatical form of human language statement |
|---|---|---|
| 0 | 0 to 4 | noun-verb |
| 1 | 5 to 6 | noun-verb-noun |
| 2 | 7 to 8 | noun-adverb-verb noun |

It is further assumed that, during step 330, it is determined that no salt bits are used and that the transform is the Hamming Code 7/4/3. The Hamming Code 7/4/3 works on 4-bit blocks of data.

It is further assumed, for purposes of illustration, that the key to be transferred across the human machine interface is decimal 42, received during step 340. The binary representation is 101010, a 6-bit string.

Because there are no salted bits to insert, step 350 is skipped.

In step 360, the Hamming Code is applied to transform the 6-bit binary string 101010. To generate two 4-bit blocks, the 6-bit string is padded with two zero bits in the least significant (right-most) bits. The 8-bit string is then 10101000. The Hamming Code inserts three parity bits after every four bit block. The transformed-padded key is then 1010011 1000110.

In step 370 the size of the transformed padded key is determined to be 14 bits.

In step 374, the grammatical template is based on an 8-bit form (entry 2 in the grammar matrix of Table 6) and a 6-bit form (entry 1 in the grammar matrix of Table 6).

In step 380 a sequence of human language words are formed based on the grammatical template and the dictionaries and the transformed padded key, as shown in Table 7.

TABLE 7

Hamming example words indexed transformed padded key.

| Portion within transformed padded key | bits in portion | dictionary | concept representative word |
|---|---|---|---|
| 1 | 10 | noun | DOG |
| 2 | 10 | adverb | LOUDLY |
| 3 | 01 | verb | ATE |
| 4 | 11 | noun. | FISH. |
| 5 | 00 | noun | JOE |
| 6 | 01 | verb | ATE |
| 7 | 10 | noun. | DOG. |

The word sequence is DOG LOUDLY ATE FISH. JOE ATE DOG. Note that a different permutation of the verb dictionary is not used for the second verb; thus the same index 01 produces the same word "ATE."

It is assumed that step 382 is omitted, and the final presentable statement is the same.

During decoding, the human user imperfectly enters a statement that is received during step 410. It is assumed for purposes of illustration that the imperfect statement is DOG QUIKLY ATE FISH. JOE RAN DOG.

No ancillary words are included so none are stripped during step 420. In some embodiments, misspellings are not included in the associated words in a dictionary, and a separate spelling correction process is used during step 420. Thus the misspelled word QUIKLY is corrected by that process during step 420 in some embodiments. In the illustrated embodiment, however, misspellings are included in the associated words in the dictionary; and the misspelling is not corrected during step 420.

It is assumed that the word form template is known, so step 430 and step 440 are omitted.

In step 350, the words are mapped to their base forms and associated values, as shown in Table 8.

TABLE 8

Example values produced by mapping statement words to a selected grammatical form.

| Position in grammatical form | word type in position for grammatical form | dictionary | word in position | concept representative word | binary value |
|---|---|---|---|---|---|
| 1 | noun | noun | DOG | dog | 10 |
| 2 | adverb | adverb | QUIKLY | quickly | 00 |
| 3 | verb | verb | ATE | ate | 01 |
| 4 | noun. | noun. | FISH | fish | 11 |
| 5 | noun | noun | JOE | Joe | 00 |
| 6 | verb | verb | RAN | ran | 00 |
| 7 | noun. | noun. | DOG | dog | 10 |

Thus, the binary form of the human language statement is determined to be

10_0_0011 1000_0_10

The incorrect bits are underlined for purposes of illustration.

In step 460, it is determined that the reverse transform can be run. In some embodiments, checks are run against parity bits. If the checks are all successful, then the message is decoded and assumed correct. In the illustrated embodiment, it is assumed that there is only one bit error in a 7 bit block. If this is not the case, then an error may result.

In step 470 the reverse Hamming Code process is run, as is well known in the art. This corrects the data based on forming agreement between the 4-bit block and the three parity bits. After running the Hamming Code, the parity bits and the 4-bit data blocks agree, giving 1010011 1000110.

As part of the reverse transform, the parity bits are removed, leaving the two 4-bit blocks.

1010 1000.

As part of the reverse transform, the padding bits are removed, leaving the 6-bit code

101010 that has a decimal value of 42. Thus the original key is recovered.

In this example, the correct key is reconstituted even in the face of a wrong concept: "RAN" instead of "ATE" that gave an improper index of 00 instead of 01. This further demonstrates an advantage of using an ECC as the transform in step 360.

5.0 Implementation Mechanisms—Hardware Overview

Figure 5:
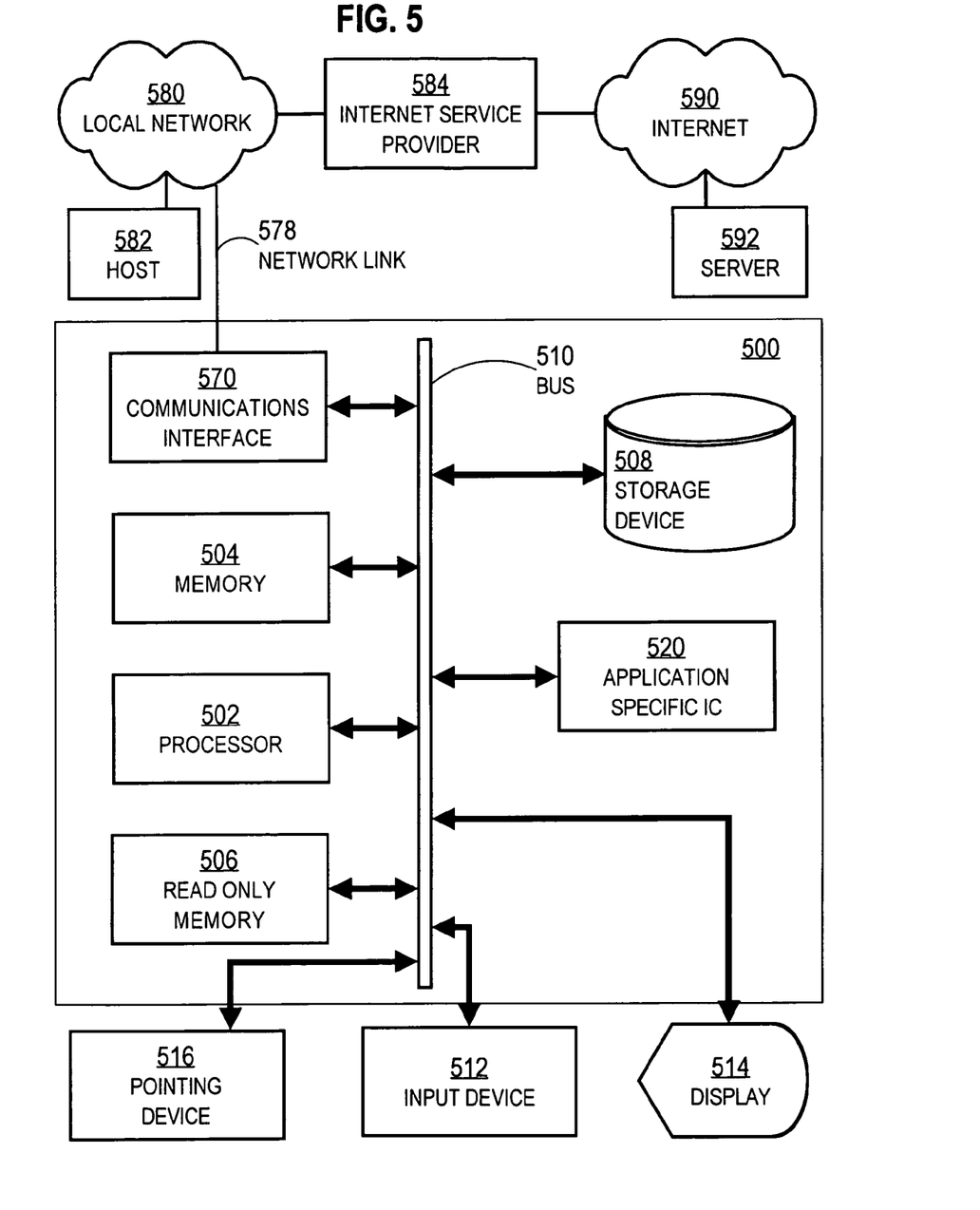
FIG. 5 is a block diagram that illustrates a computer system 500 upon which an embodiment of the invention may be implemented

FIG. 5 is a block diagram that illustrates a computer system 500 upon which an embodiment of the invention may be implemented. Computer system 500 includes a communication mechanism such as a bus 510 for passing information between other internal and external components of the computer system 500. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 510 includes many parallel conductors of information so that information is transferred quickly among devices coupled to the bus 510. One or more processors 502 for processing information are coupled with the bus 510. A processor 502 performs a set of operations on information. The set of operations include bringing information in from the bus 510 and placing information on the bus 510. The set of operations also typically include comparing two or more units of information, shifting positions of units of information, and combining two or more units of information, such as by addition or multiplication. A sequence of operations to be executed by the processor 502 constitute computer instructions.

Computer system 500 also includes a memory 504 coupled to bus 510. The memory 504, such as a random access memory (RAM) or other dynamic storage device, stores information including computer instructions. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of computer instructions. The computer system 500 also includes a read only memory (ROM) 506 or other static storage device coupled to the bus 510 for storing static information, including instructions, that is not changed by the computer system 500. Also coupled to bus 510 is a non-volatile (persistent) storage device 508, such as a magnetic disk or optical disk, for storing information, including instructions, that persists even when the computer system 500 is turned off or otherwise loses power.

Information, including instructions, is provided to the bus 510 for use by the processor from an external input device 512, such as a keyboard containing alphanumeric keys operated by a human user, or a sensor. A sensor detects conditions in its vicinity and transforms those detections into signals compatible with the signals used to represent information in computer system 500. Other external devices coupled to bus 510, used primarily for interacting with humans, include a display device 514, such as a cathode ray tube (CRT) or a liquid crystal display (LCD), for presenting images, and a pointing device 516, such as a mouse or a trackball or cursor direction keys, for controlling a position of a small cursor image presented on the display 514 and issuing commands associated with graphical elements presented on the display 514.

In the illustrated embodiment, special purpose hardware, such as an application specific integrated circuit (IC) 520, is coupled to bus 510. The special purpose hardware is configured to perform operations not performed by processor 502 quickly enough for special purposes. Examples of application specific ICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends and receives electrical, acoustic or electromagnetic signals, including infrared and optical signals, that carry information streams, such as digital data. Such signals are examples of carrier waves.

The term computer-readable medium is used herein to refer to any medium that participates in providing information to processor 502, including instructions for execution. Such a medium may take many forms, including, but not limited to, non-volatile media, volatile media and transmission media. Non-volatile media include, for example, optical or magnetic disks, such as storage device 508. Volatile media include, for example, dynamic memory 504. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Network link 578 typically provides information communication through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590. A computer called a server 592 connected to the Internet provides a service in response to information received over the Internet. For example, server 592 provides information representing video data for presentation at display 514.

The invention is related to the use of computer system 500 for implementing the techniques described herein. According to one embodiment of the invention, those techniques are performed by computer system 500 in response to processor 502 executing one or more sequences of one or more instructions contained in memory 504. Such instructions, also called software and program code, may be read into memory 504 from another computer-readable medium such as storage device 508. Execution of the sequences of instructions contained in memory 504 causes processor 502 to perform the method steps described herein. In alternative embodiments, hardware, such as application specific integrated circuit 520, may be used in place of or in combination with software to implement the invention. Thus, embodiments of the invention are not limited to any specific combination of hardware and software.

The signals transmitted over network link 578 and other networks through communications interface 570, which carry information to and from computer system 500, are exemplary forms of carrier waves. Computer system 500 can send and receive information, including program code, through the networks 580, 590 among others, through network link 578 and communications interface 570. In an example using the Internet 590, a server 592 transmits program code for a particular application, requested by a message sent from computer 500, through Internet 590, ISP equipment 584, local network 580 and communications interface 570. The received code may be executed by processor 502 as it is received, or may be stored in storage device 508 or other non-volatile storage for later execution, or both. In this manner, computer system 500 may obtain application program code in the form of a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to an infra-red signal, a carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

6.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method operated by a computer for presenting a key for subsequent input to a process, the method comprising the steps of:

receiving key data in one or more computers that indicates a key to be input to a process, wherein the key data comprises a non-word forming combination of letters, numbers, or symbols;

configuring a dictionary to map different individual portions of the key data to different concept representative words contained in a human-language statement;

configuring the dictionary with variations of the concept representative words corresponding with errors in one or more of the concept representative words contained in the human-language statement;

using the dictionary to convert with the computer different grammatical types of concept words and incorrectly entered variations of the different grammatical types of concept words contained in the human language statement into different individual portions of second key data, wherein the different individual portions of the second key data correspond with the different individual portions of first key data; and presenting the second key data at a user interface.

2. The method as recited in claim 1 further comprising:

adding ancillary words that are not in the dictionary according to rules of language; and selecting alternative words among the plurality of words associated with a separable concept according to rules of language.

3. The method as recited in claim 1, further comprising: adding a particular number of random bits to a binary string representing the key data, whereby a different particular binary string is generated based on the key data to generate a different new second human-language statement.

4. The method as recited in claim 1, wherein:

the dictionary includes a plurality of separable concepts for each of a plurality of grammatical types of words, wherein each separable concept includes a plurality of words of the same grammatical type associated with that separable concept, no word is associated with more than one separable concept, and each separable concept is associated with a unique binary number for each grammatical type; and a particular separable concept in the dictionary is used as a substitute for each word in the human language statement that appears among the plurality of words associated with the particular separable concept to produce an ordered set of separable concepts.

5. A method operated by a computer for determining a key for input to a process, comprising the steps of:

receiving input data that comprises a first human language statement based on a second human language statement, wherein the second human language statement is reversibly generated from first key data for input to the process;

providing a dictionary that maps different individual portions of the first key data with different grammatical types of concept words in the first human-language statement and maps the individual portions of the first key data with incorrectly entered variations of the different grammatical types of concept words contained in the first human-language statement;

using the dictionary to convert with the computer the different grammatical types of concept words and incorrectly entered variations of the different grammatical types of concept words contained in the first human language statement into different individual portions of second key data, wherein the different individual portions of the second key data correspond with the different individual portions of the first key data; and providing the second key data to the process.

6. The method as recited in claim 5, further comprising:

including in the dictionary a plurality of separable concepts for each of a plurality of grammatical types of concept words, wherein each separable concept includes a plurality of words of the same grammatical type associated with that separable concept, no word is associated with more than one separable concept, and each separable concept is associated with a unique binary number for each grammatical type;

selecting a particular separable concept as a substitute for each word in the first human language statement that appears among the plurality of words associated with the particular separable concept to produce an ordered set of separable concepts; and forming an ordered set of binary values based on the ordered set of separable concepts, and determining the second key based on the ordered set of binary values.

7. The method as recited in claim 6, wherein:

the dictionary includes a plurality of ordered lists among which the plurality of separable concepts for a particular grammatical type of the plurality of grammatical types of concept words are ordered differently; and a different ordered list for the particular grammatical type is used at different positions within the first human language statement.

8. The method as recited in claim 6, further comprising:

excluding ancillary words including at least one of reflexive pronouns, definite and indefinite articles and prepositions from the dictionary; and removing the ancillary words in the first human language statement.

9. The method as recited in claim 6, further comprising removing a particular number of random valued bits called salt bits from a particular location in the ordered set of binary values.

10. The method as recited in claim 6, further comprising:

receiving grammar matrix data that indicates a plurality of grammatical forms of human language statements for a corresponding plurality of sizes of binary strings;

determining a sequence of grammatical types of words based on the ordered set of separable concepts, and selecting a particular grammatical form from the grammar matrix data based on the sequence of grammatical types; and forming the ordered set of binary values based on the ordered set of separable concepts and the particular grammatical form.

11. The method as recited in claim 10, further comprising:

determining whether the particular grammatical form can be selected from the grammar matrix based on the ordered set of separable concepts;

if it is determined that the particular grammatical form can not be selected, then sending an error message to a user to input a third human language statement based on human memory of the second human language statement; and if it is determined that the particular grammatical form can not be selected, then performing said step of selecting the particular grammatical form from the grammar matrix data based on the sequence of grammatical types.

12. An apparatus for presenting a key, comprising:
   means for receiving input data associated with a first human language statement based on a second human language statement, wherein the second human language statement is reversibly generated from first key data for input to a process;
   means for providing a dictionary that maps the first key data with an ordered sequence of different grammatical types of words in the first human-language statement, wherein the different grammatical types of words correspond with particular locations of different portions of the first key data;
   means for using the dictionary to convert the different grammatical types of words and incorrectly entered variations of the different grammatical types of words contained in the first human language statement into different individual portions of second key data; and
   means for providing the second key data to the process.

13. The apparatus as recited in claim 12, further comprising:
   means for providing a dictionary that includes a plurality of separable concepts for each of a plurality of the grammatical types of words, wherein each separable concept includes a plurality of words of the same grammatical type associated with that separable concept, no word is associated with more than one separable concept, and each separable concept is associated with a unique binary number for each grammatical type;
   means for selecting a particular separable concept in the dictionary as a substitute for each word in the first human language statement that appears among the plurality of words associated with the particular separable concept to produce an ordered set separable concepts; and
   means for forming an ordered set of binary values based on the ordered set of separable concepts, and
   means for determining the second key based on the ordered set of binary values.

14. The apparatus as recited in claim 13, wherein:
   the dictionary includes a plurality of ordered lists among which the plurality of separable concepts for a particular grammatical type of the plurality of grammatical types of words are ordered differently; and
   a different ordered list for the particular grammatical type is used at different positions within the first human language statement.

15. A computer-readable storage device carrying one or more sequences of instructions, wherein execution of the one or more sequences of instructions by one or more processors causes the one or more processors to perform the steps of:
   receiving input data corresponding with a first human language statement that includes variations from of a second human language statement, wherein the second human language statement is reversibly generated from first key data for input to a process;
   determining a word type sequence template according to a sequence of the words in the first human language statement;
   determining a grammatical form for the first human language statement according to the word type sequence template;
   determining data values associated with each word position in the grammatical form based on the words in the first human language statement and the associated position of the words in the grammatical form;
   creating second key data by combining together the data values in an ordered sequence corresponding with an order of each associated word position in the grammatical form.

16. The computer-readable storage device as recited in claim 15, further comprising:
   providing a dictionary that includes a plurality of separable concepts for each of a plurality of grammatical types of words, wherein each separable concept includes a plurality of words of the same grammatical type associated with that separable concept, and each separable concept is associated with a unique binary number for each grammatical type;
   selecting a particular separable concept in the dictionary as a substitute for each word in the first human language statement that appears among the plurality of words associated with the particular separable concept to produce an ordered set separable concepts; and
   forming an ordered set of binary values based on the ordered set of separable concepts, and
   determining the second key based on the ordered set of binary values.

17. The computer-readable storage device as recited in claim 16, wherein:
   the dictionary includes a plurality of ordered lists among which the plurality of separable concepts for a particular grammatical type of the plurality of grammatical types of words are ordered differently; and
   a different ordered list for the particular grammatical type is used at different positions within the first human language statement.

18. A computer-readable storage device carrying one or more sequences of instructions, wherein execution of the one or more sequences of instructions by one or more processors causes the one or more processors to perform the steps of:
   receiving input data that indicates a first human language statement that includes variations from of a second human language statement, wherein the second human language statement is reversibly generated from key data for input to a process;
   receiving dictionary data that indicates a plurality of separable concepts for each of a plurality of grammatical types of words, wherein each separable concept includes a plurality of words of the same grammatical type associated with that separable concept by correct and common incorrect associations;
   receiving statement form data that indicates a particular grammatical form of the first human language statement comprising an ordered plurality of grammatical types of words;
   generating a particular binary string based on the key data;
   associating each grammatical type of word in the particular grammatical form with a corresponding portion of the particular binary string, wherein every bit of the particular binary string is in a portion of the particular binary string that corresponds to a grammatical type of word in the particular grammatical form;
   for each grammatical type of word in the particular grammatical form, selecting a separable concept based on a value in the portion of the particular binary string that corresponds to the grammatical type; and
   generating the second human-language statement based on the selected separable concept for every grammatical type of word in the particular grammatical form.

19. The computer-readable storage device as recited in claim 18, wherein:
  the dictionary data includes a plurality of ordered lists among which the plurality of separable concepts for a particular grammatical type of the plurality of grammatical types of words are ordered differently; and
  the grammatical form uses a different ordered list for the particular grammatical type at different positions within the grammatical form.

20. The computer-readable storage device as recited in claim 18, further comprising:
  receiving grammar matrix data that indicates a plurality of grammatical forms of human language statements for a corresponding plurality of sizes of binary strings; and
  selecting a particular grammatical form from the grammar matrix data based on a particular size of the particular binary string.

21. The computer-readable storage device as recited in claim 20, wherein execution of the one or more sequences of instructions further causes the one or more processors to perform the step of forming the grammar matrix data, comprising the steps of:
  determining a number of bits for each of the grammatical types of words;
  determining a plurality of grammatical forms each comprising an ordered plurality of the grammatical types of words which ordered plurality is commonly used in human language; and
  for each grammatical form of two or more grammatical types of words determine a range of bit string lengths for which the grammatical forms provides sufficient bits.

22. The computer-readable storage device as recited in claim 18, said step of generating the particular binary string further comprising adding a particular number of random bits called salt bits to a particular location in a binary representation of the key data to form salted key data.

23. The computer-readable storage device as recited in claim 22, said step of generating the particular binary string further comprising applying a reversible transform to the salted key data, wherein the transform transforms two nearby values input to the transform to outputs from the transform that are not nearby to each other.

24. The computer-readable storage device as recited in claim 23, said step of applying a reversible transform further comprises applying a reversible Error Correction Code (ECC) transform, determining whether a particular value can not have been produced by the ECC transform, and detecting at least some errors in converting from the first human-language statement to the key data according to the ECC transform.

25. The computer-readable storage device as recited in claim 18, said step of generating the particular binary string further comprising applying a reversible transform to a binary representation of the key data, wherein the transform transforms two nearby values input to the transforms to outputs from the transform that are not nearby to each other.

26. The computer-readable storage device as recited in claim 25, said step of applying a reversible transform further comprising applying a reversible Error Correction Code (ECC) transform, determining whether a particular value can not have been produced by the ECC transform, and at least some errors in converting from the first human-language statement to the key data are detected according to the ECC transform.

27. The computer-readable storage device as recited in claim 18, wherein execution of the one or more sequences of instructions further causes the one or more processors to perform the step of forming the dictionary data, comprising the steps of:
  selecting a number of separable concepts for each grammatical type of word in the second human language statement, wherein the number is equal to a particular power of two, whereby each separable concept is uniquely associated with a particular value for a fixed number of bits associated with the particular power of two;
  for each separable concept, associating a plurality of words of the same grammatical type including at least two of synonyms, antonyms, conjugated forms, variations with number and gender and case, common misspellings, homophones, and similar appearing unrelated words; and
  removing duplicate words from the dictionary data so that each spelling of a word appears only once in the dictionary data for a particular grammatical type of word.

28. The computer-readable storage device as recited in claim 27, wherein the grammatical types of words include nouns, transitive verbs, intransitive verbs, adverbs, adjectives.

29. The computer-readable storage device as recited in claim 27, said step of forming the dictionary data further comprising excluding from the dictionary data ancillary words including at least one of reflective pronouns, definite and indefinite articles, and prepositions.

* * * * *